US008392594B2

(12) United States Patent
Georgis et al.

(10) Patent No.: US 8,392,594 B2
(45) Date of Patent: Mar. 5, 2013

(54) SYSTEM AND METHOD FOR EFFECTIVELY PROVIDING CONTENT TO CLIENT DEVICES IN AN ELECTRONIC NETWORK

(75) Inventors: Nikolaos Georgis, San Diego, CA (US); Paul Hwang, Burbank, CA (US); Frank Li-De Lin, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 796 days.

(21) Appl. No.: 11/699,908

(22) Filed: Jan. 30, 2007

(65) Prior Publication Data
US 2008/0183794 A1 Jul. 31, 2008

(51) Int. Cl.
G06F 15/16 (2006.01)
(52) U.S. Cl. ......................................... 709/231; 709/219
(58) Field of Classification Search ................... 709/201
See application file for complete search history.

(56) References Cited

U.S. PATENT DOCUMENTS

| | | | | |
|---|---|---|---|---|
| 6,378,129 | B1* | 4/2002 | Zetts | 725/94 |
| 6,463,471 | B1* | 10/2002 | Dreke et al. | 709/224 |
| 6,662,231 | B1* | 12/2003 | Drosset et al. | 709/229 |
| 7,055,168 | B1* | 5/2006 | Errico et al. | 725/46 |
| 7,103,643 | B1* | 9/2006 | Jacobs et al. | 709/219 |
| 7,319,863 | B2* | 1/2008 | Engstrom et al. | 455/414.3 |
| 7,478,059 | B2* | 1/2009 | Crocitto | 705/14.14 |
| 7,616,862 | B2* | 11/2009 | Yoo et al. | 386/239 |
| 7,783,767 | B2* | 8/2010 | Collazo | 709/229 |
| 7,882,140 | B1* | 2/2011 | DiLorenzo | 707/802 |
| 2002/0083118 | A1* | 6/2002 | Sim | 709/105 |
| 2002/0111912 | A1* | 8/2002 | Hunter et al. | 705/52 |
| 2002/0120925 | A1* | 8/2002 | Logan | 725/9 |
| 2003/0028451 | A1* | 2/2003 | Ananian | 705/27 |
| 2003/0061305 | A1* | 3/2003 | Copley et al. | 709/217 |
| 2003/0171990 | A1 | 9/2003 | Rao et al. | |
| 2003/0237097 | A1* | 12/2003 | Marshall et al. | 725/105 |
| 2004/0001081 | A1 | 1/2004 | Marsh | |

(Continued)

FOREIGN PATENT DOCUMENTS

| | | |
|---|---|---|
| JP | 2004-133541 A | 4/2004 |
| WO | WO 03/036970 A1 | 5/2003 |

(Continued)

OTHER PUBLICATIONS

Robertson, Grant, "Weird Al Yankovic Says Digital Is a Raw Deal for Some Artists" [Online], Jun. 2006 [Retrieved Jun. 2009], Digital Music, <http://digitalmusic.weblogsinc.com/2006/06/14/weird-al-yankovic-says-digital-is-a-raw-deal-for-some-artists>, pp. 1-10.*

*Primary Examiner* — Bunjob Jaroenchonwanit
(74) *Attorney, Agent, or Firm* — Sony Corporation of America

(57) ABSTRACT

A system and method for effectively supporting content distribution in an electronic network includes a content server and a peer-to-peer network of client devices. The content server stores content items received from a content provider. A recommendation engine of the content server creates a global recommendation list to identify an optimal global candidate from among the stored content items for performing an automatic and transparent content download procedure. The recommendation engine creates the global recommendation list by analyzing selectable content-ranking criteria from a plurality of device users of the client devices. The content server then downloads the optimal global candidate from the stored content items to one or more identified target devices during the content download procedure.

42 Claims, 11 Drawing Sheets

U.S. PATENT DOCUMENTS

| | | |
|---|---|---|
| 2004/0002896 A1 | 1/2004 | Alanen et al. |
| 2004/0093372 A1 | 5/2004 | Chen et al. |
| 2004/0141476 A1* | 7/2004 | Chumbley et al. ............ 370/326 |
| 2004/0162787 A1* | 8/2004 | Madison et al. ................ 705/64 |
| 2004/0210538 A1* | 10/2004 | Forest ............................. 705/80 |
| 2004/0260786 A1* | 12/2004 | Barile ........................... 709/217 |
| 2005/0028200 A1* | 2/2005 | Sardera ........................... 725/42 |
| 2005/0076098 A1* | 4/2005 | Matsubara et al. ........... 709/219 |
| 2005/0149340 A1 | 7/2005 | Murakami et al. |
| 2005/0160154 A1 | 7/2005 | Raciborski et al. |
| 2005/0177618 A1 | 8/2005 | Zimler et al. |
| 2005/0177624 A1 | 8/2005 | Oswald et al. |
| 2005/0216442 A1* | 9/2005 | Liskov et al. ..................... 707/1 |
| 2006/0087941 A1* | 4/2006 | Obradovich ................ 369/47.12 |
| 2006/0136551 A1* | 6/2006 | Amidon et al. ............... 709/203 |
| 2006/0143236 A1* | 6/2006 | Wu ............................. 707/104.1 |
| 2006/0173974 A1* | 8/2006 | Tang ............................. 709/217 |
| 2006/0212367 A1 | 9/2006 | Gross |
| 2006/0230331 A1* | 10/2006 | Abanami et al. .............. 715/500 |
| 2006/0242193 A1* | 10/2006 | Dunning ....................... 707/102 |
| 2006/0256961 A1* | 11/2006 | Brainard et al. ................ 380/44 |
| 2007/0033269 A1* | 2/2007 | Atkinson et al. ............. 709/219 |
| 2007/0067429 A1* | 3/2007 | Jain et al. ..................... 709/223 |
| 2007/0130585 A1* | 6/2007 | Perret et al. .................... 725/46 |
| 2007/0147351 A1* | 6/2007 | Dietrich et al. ............... 370/352 |
| 2007/0172131 A1* | 7/2007 | Chosokabe ................... 382/224 |
| 2007/0220081 A1* | 9/2007 | Hyman ........................ 709/203 |
| 2007/0282898 A1* | 12/2007 | Stark et al. ................ 707/103 R |
| 2007/0288966 A1* | 12/2007 | Javid et al. ...................... 725/46 |
| 2007/0299976 A1* | 12/2007 | Zafar et al. ................... 709/229 |
| 2008/0016205 A1* | 1/2008 | Svendsen ..................... 709/224 |
| 2008/0046740 A1* | 2/2008 | Narayanan et al. ........... 713/176 |
| 2008/0162435 A1* | 7/2008 | Dooms et al. .................... 707/3 |
| 2008/0162665 A1* | 7/2008 | Kali ............................. 709/217 |
| 2008/0175190 A1* | 7/2008 | Lee et al. ...................... 370/328 |
| 2008/0189429 A1* | 8/2008 | DaCosta ....................... 709/231 |
| 2008/0208985 A1* | 8/2008 | Georgis et al. ............... 709/206 |
| 2009/0056525 A1* | 3/2009 | Oppenheimber ............... 84/609 |
| 2009/0070185 A1* | 3/2009 | Farrelly ......................... 705/10 |
| 2009/0083116 A1* | 3/2009 | Svendsen ....................... 705/10 |
| 2009/0193478 A1* | 7/2009 | Jones ............................ 725/105 |
| 2009/0222117 A1* | 9/2009 | Kaplan et al. ................... 700/94 |
| 2009/0254659 A1* | 10/2009 | Li et al. ........................ 709/225 |
| 2010/0325239 A1* | 12/2010 | Khedouri et al. ............. 709/217 |

FOREIGN PATENT DOCUMENTS

| | | |
|---|---|---|
| WO | WO03041383 A2 | 5/2003 |
| WO | WO2004100010 A1 | 11/2004 |

* cited by examiner

SYSTEM AND METHOD FOR EFFECTIVELY PROVIDING CONTENT TO CLIENT DEVICES IN AN ELECTRONIC NETWORK

CROSS-REFERENCE TO RELATED APPLICATION

This Application is related to U.S. patent application Ser. No. 11/602,566 entitled "System And Method For Neighborhood Optimization For Content Recommendation," that was filed on Nov. 21, 2006, to U.S. patent application Ser. No. 11/715,803, entitled "System And Method For Video Recommendation Based On Video Frame Features," that was filed on Mar. 8, 2007, to U.S. patent application Ser. No. 11/974,715, entitled "System And Method For Effectively Performing A Network Simulation Procedure," that was filed on Oct. 16, 2008, and to U.S. patent application Ser. No. 11/711,259, entitled "System And Method For Preloading Content Segments To Client Devices In An Electronic Network," that was filed on Feb. 27, 2007. The foregoing related Applications are commonly owned, and are hereby incorporated by reference.

BACKGROUND SECTION

1. Field of the Invention

This invention relates generally to techniques for managing electronic information, and relates more particularly to a system and method for effectively providing content items to client devices in an electronic network.

2. Description of the Background Art

Implementing effective methods for managing electronic information is a significant consideration for designers and manufacturers of contemporary electronic devices. However, effectively managing information utilized by devices in an electronic network may create substantial challenges for system designers. For example, enhanced demands for increased device functionality and performance may require more system processing power and require additional software resources. An increase in processing or software requirements may also result in a corresponding detrimental economic impact due to increased production costs and operational inefficiencies.

Furthermore, enhanced device capability to perform various advanced data management operations may provide additional benefits to a system user, but may also place increased demands on the control and management of various system components. For example, an enhanced electronic network device that effectively manages electronic content information may benefit from an effective implementation because of the large amount and complexity of the digital data involved.

Due to growing demands on system resources and substantially increasing data magnitudes, it is apparent that developing new techniques for managing information in electronic networks is a matter of concern for related electronic technologies. Therefore, for all the foregoing reasons, developing effective techniques for managing information in electronic networks remains a significant consideration for designers, manufacturers, and users of contemporary electronic devices.

SUMMARY

In accordance with the present invention, a system and method for providing content items to client devices in an electronic network are disclosed. In one embodiment, a profile manager of a content server in the electronic network initially performs various client profiling procedures to compile client profiles for respective device users of the various client devices. The client devices are configured in a peer-to-peer network within the electronic network to support bi-directional communications between any of the client devices.

In certain embodiments, a ranking manager of a recommendation engine from the content server performs individual content ranking procedures to create individual recommendation lists that correspond to respective device users of the client devices. The ranking manager may utilize any effective techniques and/or ranking criteria to create the individual recommendation lists. For example, the ranking manager may utilize individual ranking factors from the client profiles to generate the individual recommendation lists.

In addition, a peer-to-peer module may collect peer-to-peer statistics that reflect any appropriate information and characteristics of the peer-to-peer network. For example, the peer-to-peer statistics may include any desired type of statistical information regarding content transfer procedures for transferring content items between client devices in the peer-to-peer network. In accordance with the present invention, the ranking manager may then perform a global content ranking procedure to create a global recommendation list that is based upon global ranking criteria from a selectable global community of device users of the client devices.

The ranking manager may utilize any effective techniques and/or global ranking criteria to create the global recommendation list. For example, the ranking manager may analyze ranking factors from a plurality of different client profiles to generate the global recommendation list. In addition, the ranking manager may utilize ranking factors from the individual recommendation lists, and from the peer-to-peer statistics to generate the global recommendation list.

Next, a download targeting module may perform a client targeting procedure that sets transfer flags to identify specific target client devices for automatically downloading an optimal global candidate identified by the global recommendation list. The download targeting module may identify appropriate target client devices by utilizing any appropriate techniques. For example, the download targeting module may evaluate the client profiles and/or the peer-to-peer statistics to determine which device users would be likely to select and pay for a particular downloaded content item.

A communication manager of the content server then automatically and transparently performs a content download procedure to push the optimal candidate from the global recommendation list to the flagged target client devices. Finally, the profile manager of the content server performs a profile update procedure for updating the client profiles to reflect any recent download activity or other information changes in the electronic network. For at least the foregoing reasons, the present invention therefore provides an improved system and method for effectively providing content to client devices in an electronic network.

DETAILED DESCRIPTION

The present invention relates to an improvement in electronic information management techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Therefore, the present invention is not intended to be limited to the embodiments shown, but is to be accorded the widest scope consistent with the principles and features described herein.

The present invention comprises a system and method for effectively supporting content distribution in an electronic network, and includes a content server and a peer-to-peer network of client devices. The content server stores content items received from a content provider. A recommendation engine of the content server creates a global recommendation list to identify an optimal global candidate from among the stored content items for performing an automatic and transparent content download procedure. The recommendation engine creates the global recommendation list by analyzing selectable content-ranking criteria from a plurality of device users of the client devices. The content server then downloads the optimal global candidate from the stored content items to one or more identified target client devices during the content download procedure.

Figure 1A:
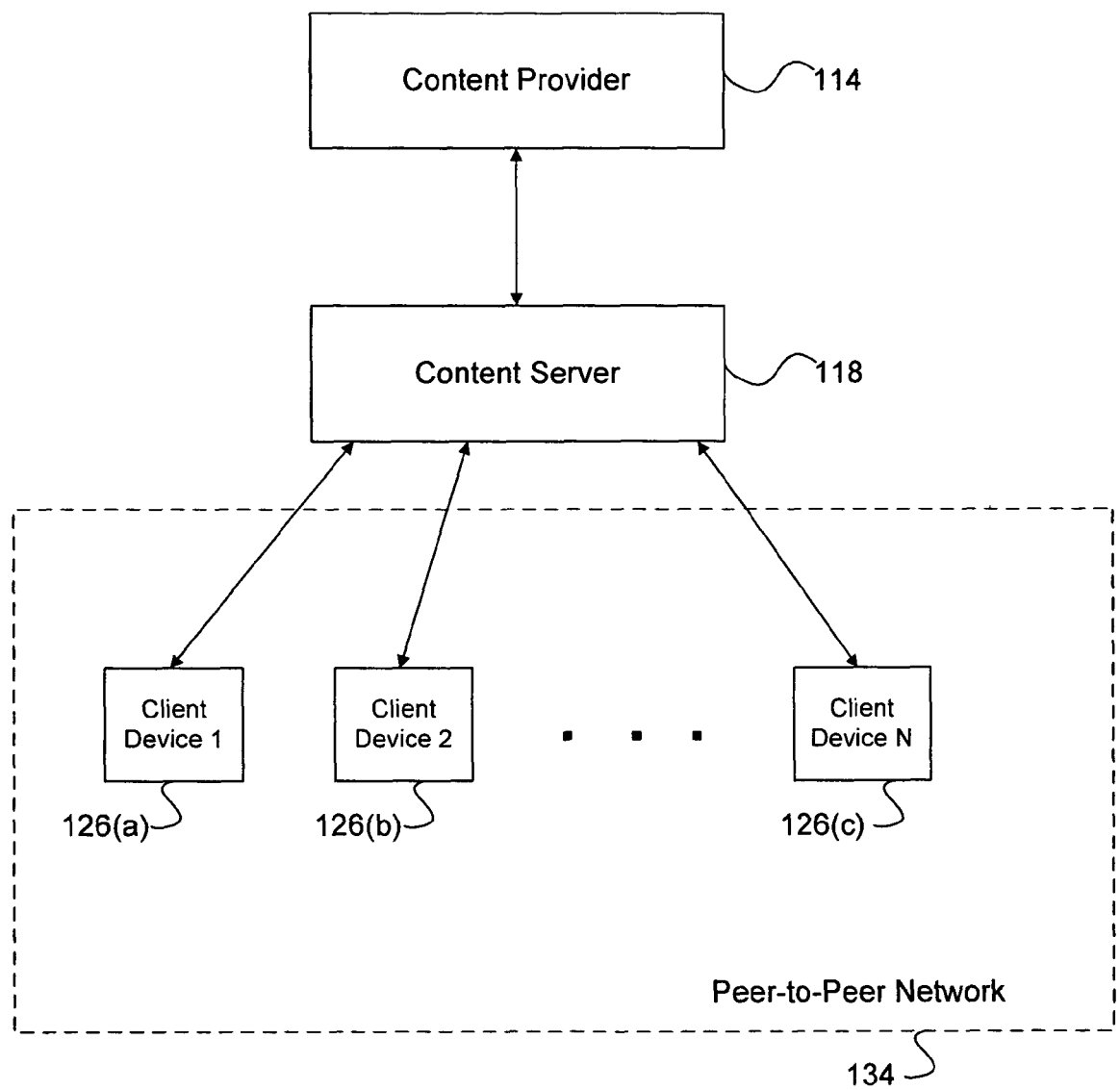
FIG. 1A is a block diagram of an electronic network, in accordance with one embodiment of the present invention.

Referring now to FIG. 1A, a block diagram of an electronic network 110 is shown, in accordance with one embodiment of the present invention. In the FIG. 1A embodiment, electronic network 110 may include, but is not limited to, a content provider 114, a content server 118, and a plurality of client devices 126. In alternate embodiments, electronic network 110 may be implemented by utilizing components and configurations in addition to, or instead of, certain of those components and configurations discussed in conjunction with the FIG. 1A embodiment.

In the FIG. 1A embodiment, content provider 114 may be implemented as any appropriate entity for providing any desired type of content data or other information to content server 118. For example, in certain embodiments, content provider 114 may be operated by a content management entity that produces or obtains the content data from any number of different content sources. In the FIG. 1A embodiment, the content information provided by content provider 114 may include any desired type of data or other information that is provided in any appropriate format. For example, content information may include, but is not limited to, entertainment programming, movies, video data, audio data, digital photographs, still image data, graphics, web pages, program guide information, and various types of software programs, etc.

In the FIG. 1A embodiment, content server 118 may be operated by a content distribution entity to locally store and distribute the foregoing content information received from content provider 114. Content server 118 may utilize a recommendation engine to create recommendation lists that identify appropriate content items for automatically and transparently downloading to one or more of the client devices 126 in peer-to-peer network 134. In the FIG. 1A embodiment, client devices 126 may include an electronic device 1 (126(a)) through an electronic device N (126(c)). In the FIG. 1A embodiment, each of the client devices 126 may bi-directionally communicate directly with other ones of the client devices 126 by utilizing any appropriate peer-to-peer communication techniques or other effective communication methods.

In the FIG. 1A embodiment, in return for viewing or otherwise utilizing any downloaded content items that are received from content server 118, a device user pays content provider 114 a content usage fee for the particular selected content item. For example, the device user may utilize a corresponding client device 126 to login to content server 118 or other appropriate payment service, and then make an online client payment to content provider 114 for utilizing the particular content item. Furthermore, in return for providing content downloading services to clients 126, content provider 114 pays content server 118 a content downloading fee on a download-by-download basis. For example, in certain embodiments, content provider 114 may pay content server 118 a content download fee that is based upon the total size of a corresponding downloaded content item. Further details regarding the implementation and utilization of the FIG. 1A electronic network 110 are discussed below in conjunction with FIG. 1B through FIG. 10.

Figure 1B:
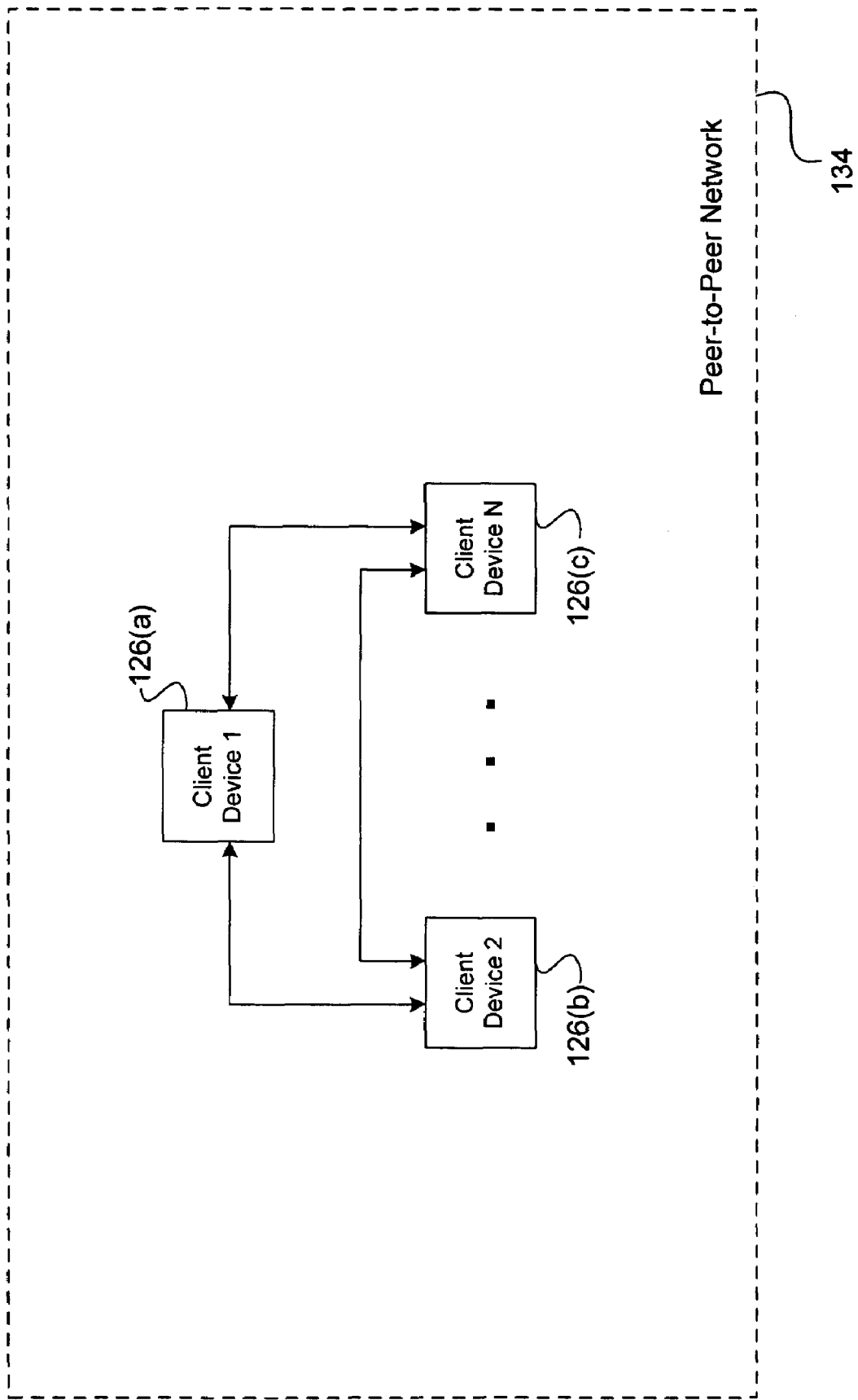
FIG. 1B is a block diagram of the peer-to-peer network of FIG. 1A, in accordance with one embodiment of the present invention.

Referring now to FIG. 1B, a block diagram of the FIG. 1A peer-to-peer network 134 is shown, in accordance with one embodiment of the present invention. The FIG. 1B embodiment includes a client device 1 (126(a)), a client device 2 (126(b)), through a client device N (126(a)). In alternate embodiments, peer-to-peer network 134 may be implemented by utilizing components and configurations in addition to, or instead of, certain of those components and configurations discussed in conjunction with the FIG. 1B embodiment. Furthermore, peer-to-peer network 134 may be implemented to include any desired number of client devices 126.

In the FIG. 1B embodiment, each of the client devices 126 may bi-directionally communicate directly with any other of the client devices 126 by utilizing any desired peer-to-peer communication techniques or other effective communication methods. For example, client device 1 (126(a)) may bi-directionally communicate directly with either client device 2 (126(b)) or client device N (126(c)), and similarly, client device 2 (126(b)) may bi-directionally communicate directly with client device N (126(c)). Furthermore, in the FIG. 1B embodiment, any of the client devices 126 in peer-to-peer network 134 may perform a peer-to-peer content transfer procedure to transfer content information (previously downloaded from content server 118) to any of the other client devices 126 in peer-to-peer network 134.

In the FIG. 1B embodiment, in return for viewing or otherwise utilizing any transferred content items that are received from other client devices 126 in a peer-to-peer transfer procedure, a device user must pay content provider 114 a content usage fee for the particular transferred content items. The device user may utilize a corresponding client device 126 to login to content server 118 or other appropriate payment service, and then make an online client payment to content provider 114 for utilizing the particular content items.

However, unlike content downloads from content server 118, in the case of peer-to-peer transfer procedures, content provider 114 advantageously does not have to pay content server 118 a content downloading fee for the peer-to-peer transfers. Peer-to-peer transfer procedures thus provide a more economical leveraging technique for disseminating content items to client devices 126, while simultaneously allowing content provider 114 to recover payment for the utilization of their content information. Additional details regarding the utilization of the FIG. 1B peer-to-peer network 134 are further discussed below in conjunction with FIGS. 3-10.

Figure 2:
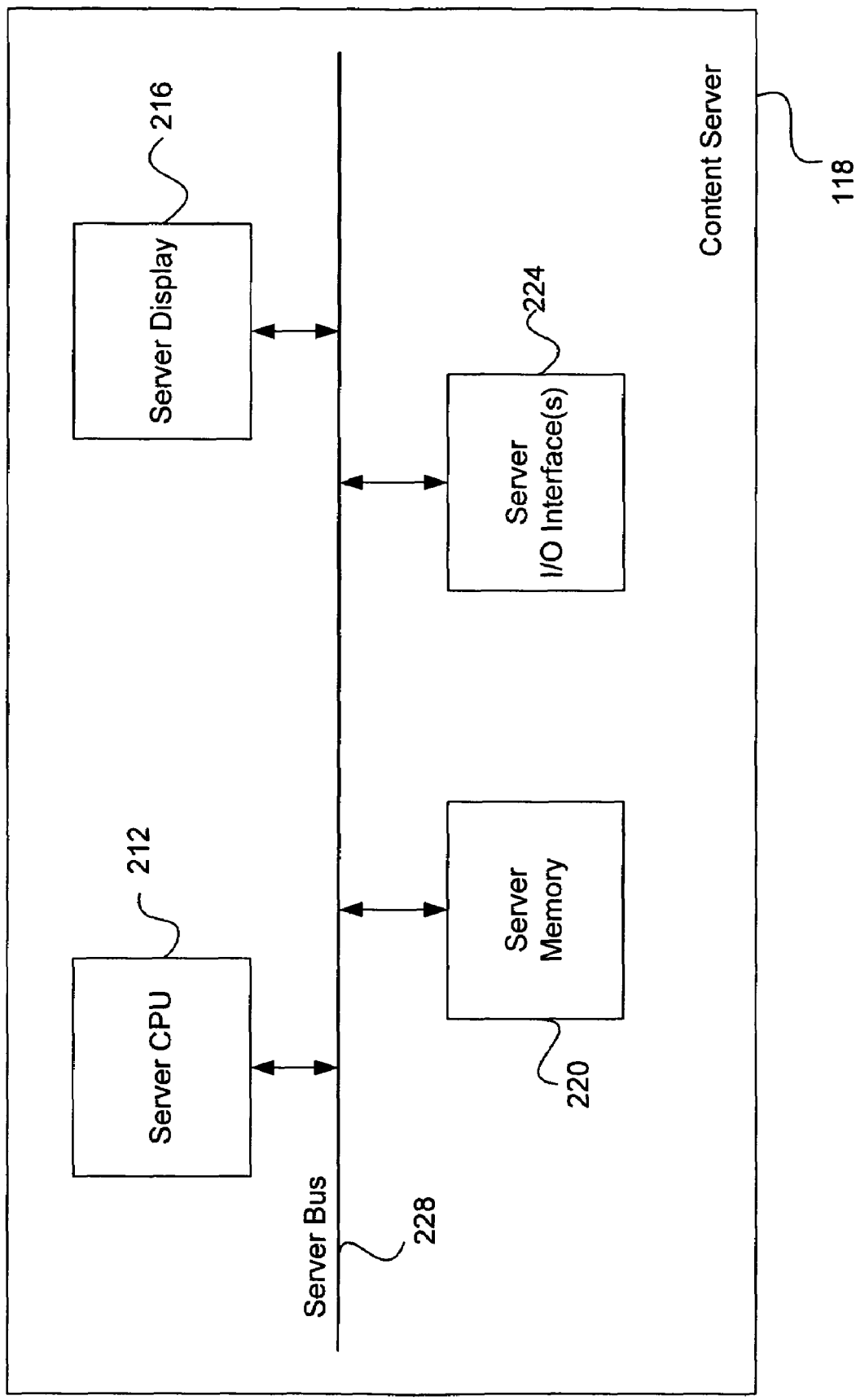
FIG. 2 is a block diagram for one embodiment of the content server of FIG. 1, in accordance with the present invention.

Referring now to FIG. 2, a block diagram for one embodiment of the FIG. 1A content server 118 is shown, in accordance with the present invention. In the FIG. 2 embodiment, content server 118 includes, but is not limited to, a server central processing unit (server CPU) 212, a server display 216, a server memory 220, and one or more server input/output interface(s) (server I/O interface(s)) 224. The foregoing components of content server 118 may be coupled to, and communicate through, a server bus 228. In alternate embodiments, content server 118 may alternately be implemented using components and configurations in addition to, or instead of, certain of those components and configurations discussed in conjunction with the FIG. 2 embodiment.

In the FIG. 2 embodiment, server CPU 212 may be implemented to include any appropriate and compatible microprocessor device that preferably executes software instructions to thereby control and manage the operation of content server 118. The FIG. 2 server display 216 may include any effective type of display technology including a cathode-ray-tube monitor or a liquid-crystal display device with an appropriate screen for displaying various information to a server user. In the FIG. 2 embodiment, server memory 220 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of server memory 220 are further discussed below in conjunction with FIG. 3.

In the FIG. 2 embodiment, server I/O interface(s) 224 may include one or more input and/or output interfaces to receive and/or transmit any required types of information by content server 118. Server I/O interface(s) 224 may include one or more means for allowing a server user to communicate with content server 118. The implementation and utilization of content server 118 is further discussed below in conjunction with FIGS. 3-4 and 7-10.

Figure 3:
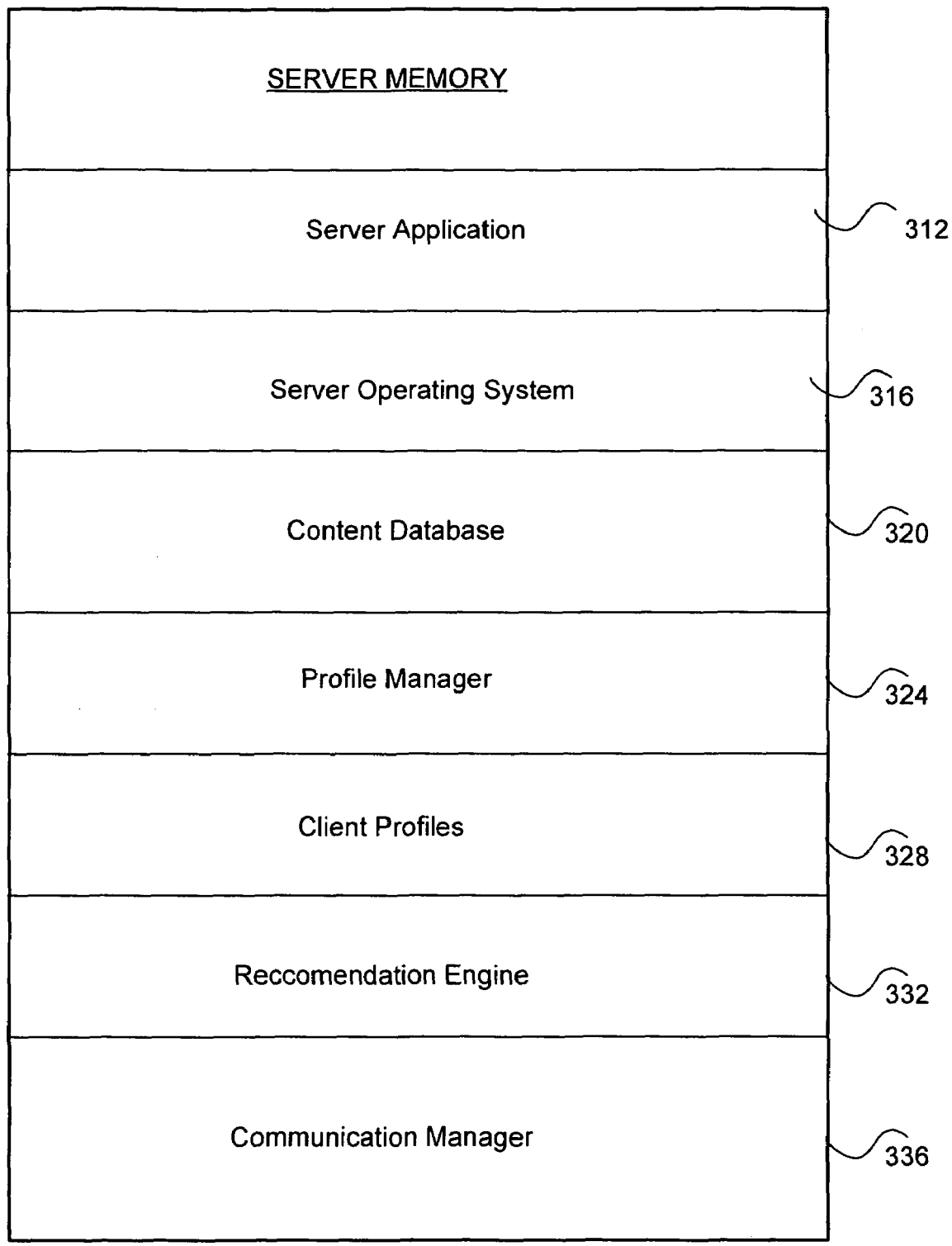
FIG. 3 is a block diagram for one embodiment of the server memory of FIG. 2, in accordance with the present invention.

Referring now to FIG. 3, a block diagram for one embodiment of the FIG. 2 server memory 220 is shown, in accordance with the present invention. In the FIG. 3 embodiment, server memory 220 may include, but is not limited to, a server application 312, a server operating system 316, a content database 320, a profile manager 324, client profiles 328, a recommendation engine 332, and a communication manager 336. In alternate embodiments, server memory 220 may include various other components and functionalities in addition to, or instead of, certain those components and functionalities discussed in conjunction with the FIG. 3 embodiment.

In the FIG. 3 embodiment, server application 312 may include program instructions that are preferably executed by server CPU 212 (FIG. 2) to perform various functions and operations for content server 118. The particular nature and functionality of server application 312 typically varies depending upon factors such as the specific type and particular functionality of the corresponding content server 118. Server operating system 316 may perform various low-level functions for content server 118.

In the FIG. 3 embodiment, content database 320 may include any appropriate type of content items or other information received by server application 312 from content provider 114 (FIG. 1) or other appropriate entity. For example, in certain embodiments, content database 320 may include, but is not limited to, any types of entertainment programming, movies, video data, audio data, digital photographs, still image data, graphics, web pages, program guide information, and various types of software programs, etc.

In the FIG. 3 embodiment, profile manager 324 may be utilized to compile and analyze client profiles 328 that each include information corresponding to the client users of respective client devices 126 (FIG. 1). One embodiment of an exemplary client profile 328 is further discussed below in conjunction with FIG. 7. In the FIG. 3 embodiment, recommendation engine 332 may be utilized to analyze various types of ranking criteria to create recommendation lists for downloading specific prioritized content items from content database 320 to appropriate client devices 126. Additional details regarding the operation and implementation of recommendation engine 332 are further discussed below in conjunction with FIGS. 4 and 8-10. In the FIG. 3 embodiment, communication manager 336 may perform appropriate communication functions with both content provider 114 and client devices 126 to transfer content items and other desired information.

Figure 4:
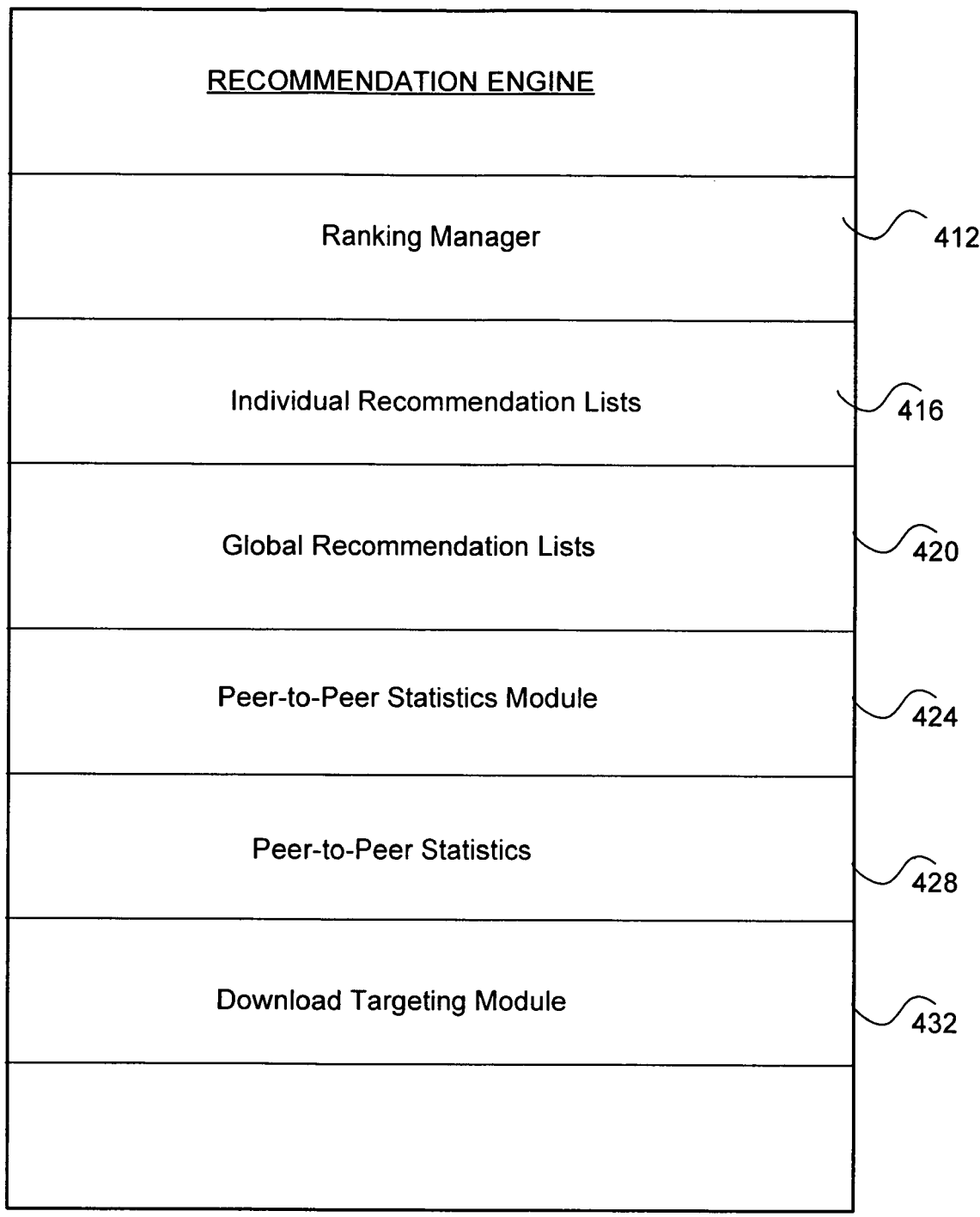
FIG. 4 is a block diagram for one embodiment of the recommendation engine of FIG. 3, in accordance with the present invention.

Referring now to FIG. 4, a diagram for one embodiment of the FIG. 3 recommendation engine 332 is shown, in accordance with the present invention. In the FIG. 4 embodiment, recommendation engine 332 may include, but is not limited to, a ranking manager 412, individual recommendation lists 416, global recommendation lists 420, a peer-to-peer statistics module 424, peer-to-peer statistics 428, and a download targeting module 432. In alternate embodiments, recommendation engine 332 may include other elements and configurations in addition to, or instead of, certain of those elements and configurations discussed in conjunction with the FIG. 4 embodiment.

In the FIG. 4 embodiment, recommendation engine 332 may utilize a ranking manager 412 for analyzing various relevant types of individual ranking criteria regarding a device user of a given client device 126 (FIG. 1) to thereby generate corresponding one of the individual recommendation lists 416. For example, ranking manager 412 may generate an individual recommendation list 416 for a given client device 126 by analyzing client attributes from a corresponding client profile 328 (FIG. 3). One embodiment for implementing an individual recommendation list 416 is further discussed below in conjunction with FIG. 8. In addition, recommendation engine 332 may also utilize ranking manager 412 for analyzing various relevant types of global ranking criteria for multiple device users of client devices 126 to thereby generate corresponding one of the global recommendation lists 420. One embodiment for implementing a global recommendation list 420 is further discussed below in conjunction with FIG. 9.

In the FIG. 4 embodiment, recommendation engine 332 may utilize a peer-to-peer statistics module 424 for monitoring and compiling peer-to-peer statistics 428 that reflect any appropriate information and characteristics of peer-to-peer network 134 (FIG. 2). For example, peer-to-peer statistics 428 may include any desired type of statistical information regarding content transfer procedures for transferring content items directly between client devices 126 in peer-to-peer network 134. In certain embodiments, peer-to-peer statistics module 424 may periodically query client devices 126 to obtain updated peer-to-peer statistics 428.

Alternately, client devices 126 may automatically inform peer-to-peer statistics module 424 regarding any new content transfer procedures, and peer-to-peer statistics module 424 may then update peer-to-peer statistics 428. In the FIG. 4 embodiment, peer-to-peer statistics 428 may be collected for each client device 126, and may include, but are not limited to, peer-to-peer transfer frequency, transferred content types, transfer target devices, transfer source devices, transferred content titles, and any other relevant statistical transfer patterns or information.

In the FIG. 4 embodiment, recommendation engine 332 may utilize download targeting module 432 for performing a client targeting procedure that sets transfer flags to identify specific targeted client devices 126 for automatically downloading one or more content items from a global recommendation list 420. Download targeting module 432 may identify appropriate target client devices 126 by utilizing any appropriate techniques. For example, download targeting module 432 may evaluate client profiles 328 (FIG. 3) and/or peer-to-peer statistics 428 to determine which device users of client devices 126 would be likely to select and pay for a particular downloaded content item.

If download targeting module 432 determines that a device user of a given client device 126(a) is unlikely to pay content provider 114 for selecting and utilizing a particular content item, then content provider 114 would be unable to recover the cost of paying content server 118 to download the content item to that particular client device 126(a). Therefore, download targeting module 432 would not set a transfer flag to identify client device 126(a) as one of the targeted client devices 126 for that particular content download procedure. The functionality and utilization of recommendation engine 332 are further discussed below in conjunction with FIGS. 8-10.

Figure 5:
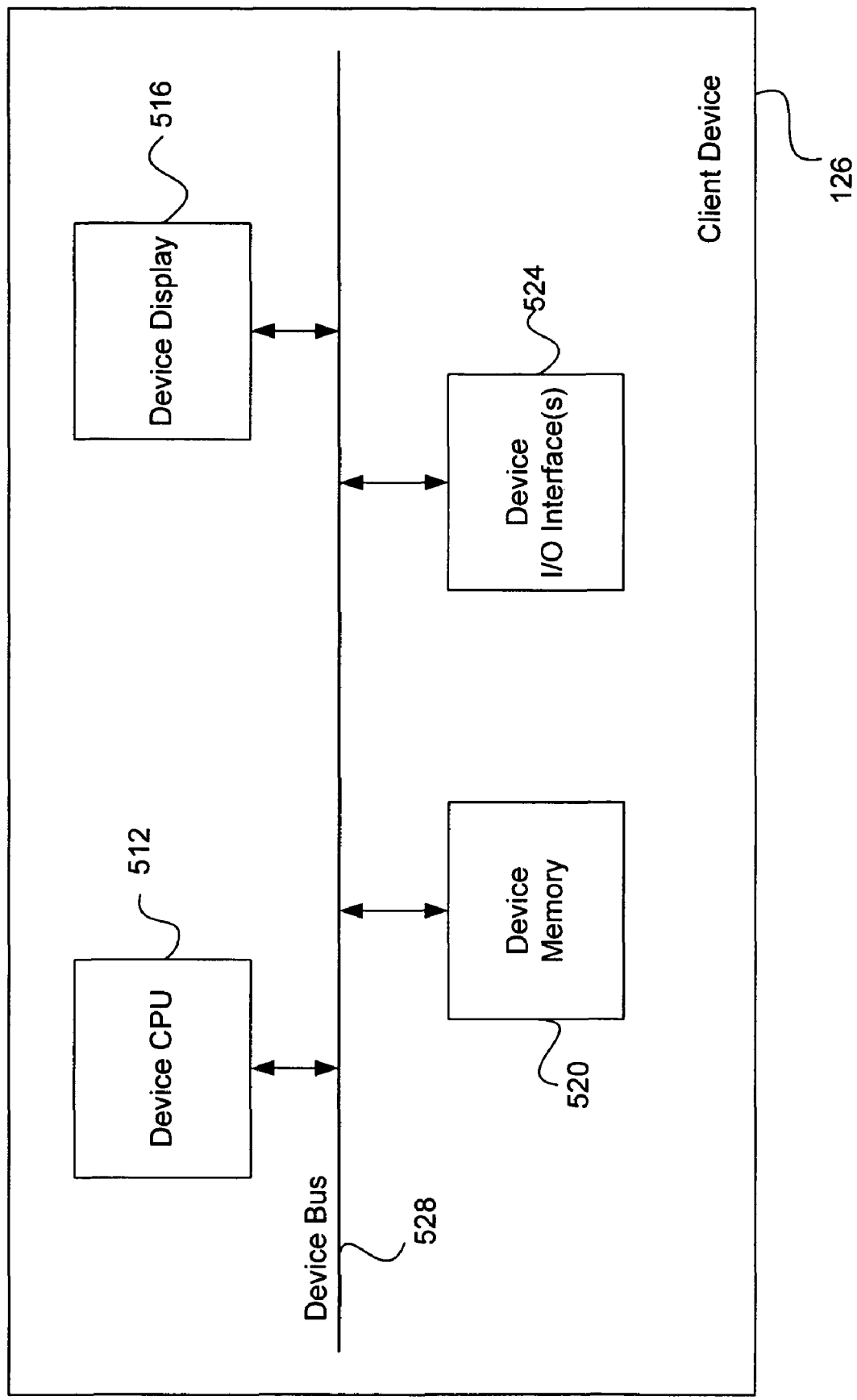
FIG. 5 is a block diagram for one embodiment of a client device from FIG. 1A, in accordance with the present invention.

Referring now to FIG. 5, a block diagram for one embodiment of a FIG. 1A client device 126 is shown, in accordance with the present invention. In the FIG. 5 embodiment, client device 126 may include, but is not limited to, a device central processing unit (device CPU) 512, a device display 516, a device memory 520, and one or more device input/output interface(s) (device I/O interface(s)) 524. The foregoing components of client device 126 may be coupled to, and communicate through, a device bus 528.

In alternate embodiments, client device 126 may readily be implemented using various components and configurations in addition to, or instead of, certain of those components and configurations discussed in conjunction with the FIG. 5 embodiment. Furthermore, in the FIG. 5 embodiment, client device 126 may be implemented as any type of appropriate electronic device. For example, in certain embodiments, client device 126 may be implemented as any type of stationary or portable consumer-electronics device, such as a television, a personal computer, a settop box, an audio-visual entertainment device, or a personal digital assistant (PDA).

In the FIG. 5 embodiment, device CPU 512 may be implemented to include any appropriate and compatible microprocessor device that preferably executes software instructions to thereby control and manage the operation of client devices 126. The FIG. 5 device display 516 may include any effective type of display technology including a cathode-ray-tube monitor or a liquid-crystal display device with an appropriate screen for displaying various information to a device user. In the FIG. 5 embodiment, device memory 520 may be implemented to include any combination of desired storage devices, including, but not limited to, read-only memory (ROM), random-access memory (RAM), and various types of non-volatile memory, such as floppy disks, memory sticks, compact disks, or hard disks. The contents and functionality of device memory 520 are further discussed below in conjunction with FIG. 6.

In the FIG. 5 embodiment, device I/O interface(s) 524 may include one or more input and/or output interfaces to receive and/or transmit any required types of information by client device 126. Device I/O interface(s) 524 may include one or more means for allowing a device user to communicate with other entities in electronic network 110 (FIG. 1A). For example, the foregoing means may include a keyboard device, a wireless remote-control device, a speech-recognition module with corresponding microphone, a graphical user interface with touch-screen capability, a hand-held device controller unit, or a selection button array mounted externally on client device 126. The implementation and utilization of client device 126 are further discussed below in conjunction with FIGS. 6 and 10.

Figure 6:
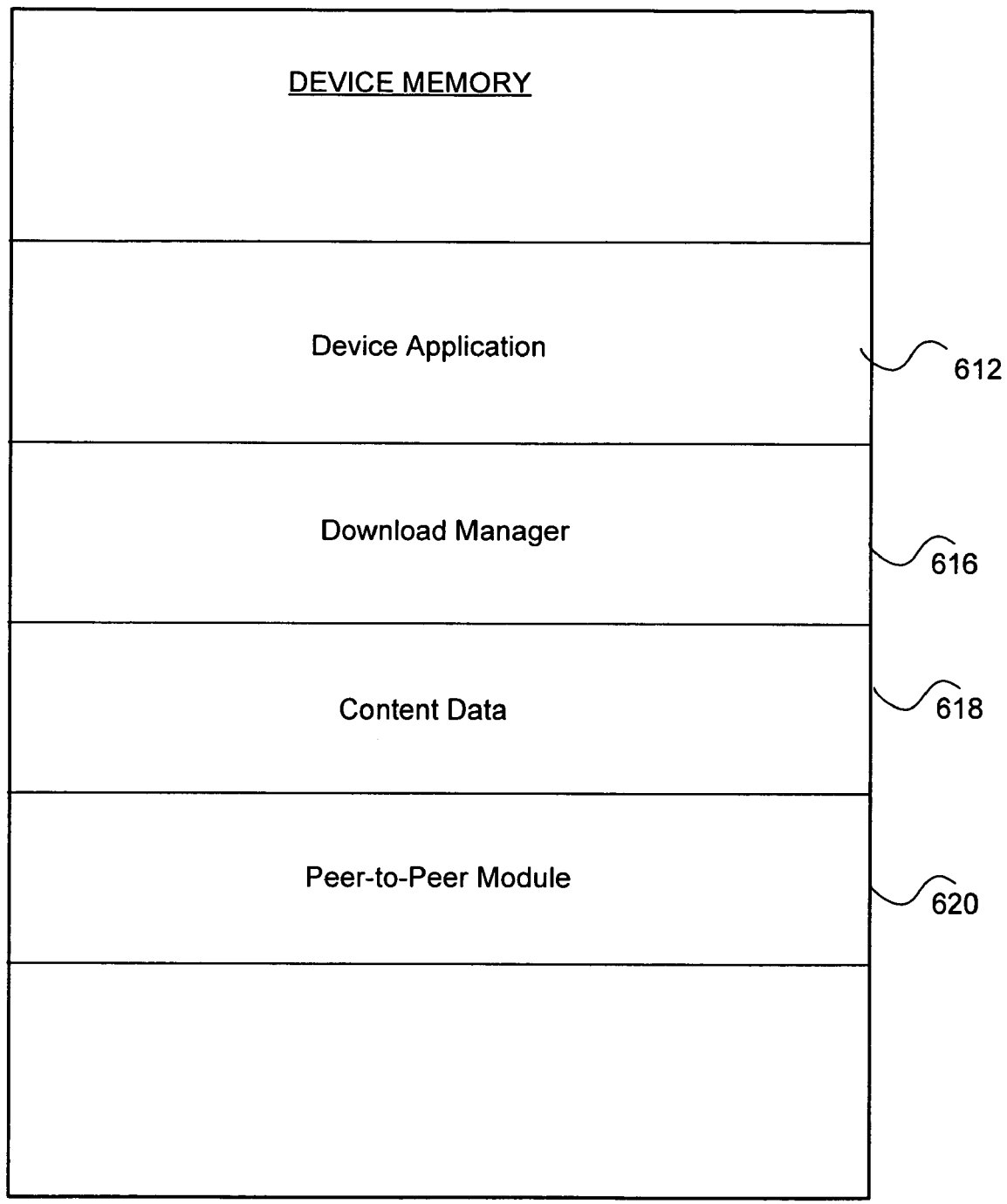
FIG. 6 is a block diagram for one embodiment of the device memory of FIG. 5, in accordance with the present invention.

Referring now to FIG. 6, a block diagram for one embodiment of the FIG. 5 device memory 520 is shown, in accordance with the present invention. In the FIG. 6 embodiment, device memory 520 includes, but is not limited to, a device application 612, a download manager 616, content data 618, and a peer-to-peer module 620. In alternate embodiments, device memory 520 may include various other components and functionalities in addition to, or instead of, certain of those components and functionalities discussed in conjunction with the FIG. 6 embodiment.

In the FIG. 6 embodiment, device application 612 may include program instructions that are preferably executed by a device CPU 512 (FIG. 5) to perform various functions and operations for a client device 126. The particular nature and functionality of device application 612 typically varies depending upon factors such as the specific type and particular functionality of the corresponding client device 126.

In the FIG. 6 embodiment, download manager 616 may perform download procedures for external entities by utilizing any appropriate techniques. For example, download manager may perform content download procedures to automatically receive and locally store content items from content server 118 as content data 618. In the FIG. 6 embodiment, peer-to-peer module 620 may be utilized by a particular client device 126 to directly communicate with any other client device 126 in peer-to-peer network 134 (FIG. 2). For example, peer-to-peer module 620 may perform a content transfer procedure to provide previously-downloaded content items from content data 618 to other client devices 126 in peer-to-peer network 134. The utilization and operation of client device 126 is further discussed below in conjunction with FIG. 10.

Figure 7:
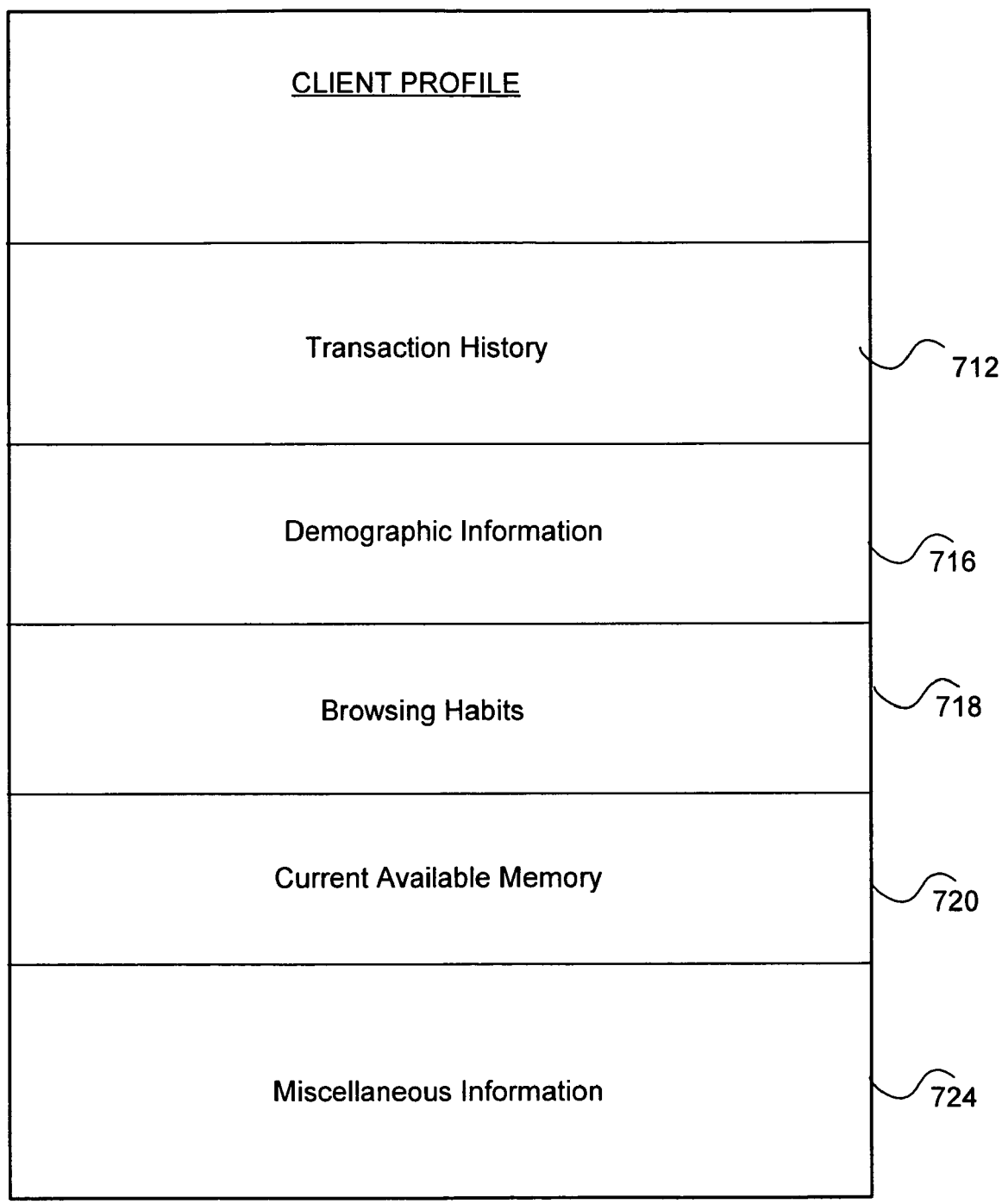
FIG. 7 is a block diagram for one embodiment of a client profile from FIG. 3, in accordance with the present invention.

Referring now to FIG. 7, a block diagram for one embodiment of a FIG. 3 client profile 520 is shown, in accordance with the present invention. In the FIG. 7 embodiment, client profile 520 includes, but is not limited to, a transaction history 712, demographic information 716, browsing habits 718, current available memory 720, and miscellaneous information 724. In alternate embodiments, client profile 520 may include other components and information in addition to, or instead of, certain of those components and information discussed in conjunction with the FIG. 7 embodiment.

In the FIG. 7 embodiment, transaction history 712 may include any information about content item downloads from content server 118 to a given client device 126. For example, transaction history 712 may include, but is not limited to, content types, content titles, download frequency, download dates, download times, and content price. In addition, the FIG. 7 client profile 328 may include any desired type of demographic information 716 regarding a corresponding device user. For example, demographic information 716 may include, but is not limited to, a client age, a client gender, a client location, a client ethnicity, a client marital status, client family information, a client annual income bracket, a client occupation, client hobbies, client interests, and a client political affiliation.

In the FIG. 7 embodiment, client profile 328 may include any appropriate information regarding the browsing habits 718 of a particular device user when searching or viewing information on the Internet or other information source via a corresponding client device 126. In the FIG. 7 example of client profile 328, current available memory 720 of a corresponding client device 126 may be monitored and updated periodically, so that content provider 114 need not pay content server 118 for downloading content information to a client device 126 that has insufficient available storage space to accommodate the downloaded content information.

In the FIG. 7 embodiment, client profile 328 may also include any other desired type of miscellaneous profile information 724. For example, client profile 328 may be implemented to include various types of information about the hardware and/or software configurations and capabilities of a corresponding client device 126. Further details regarding the utilization of client profiles 328 are further discussed below in conjunction with FIGS. 8-10.

Figure 8:
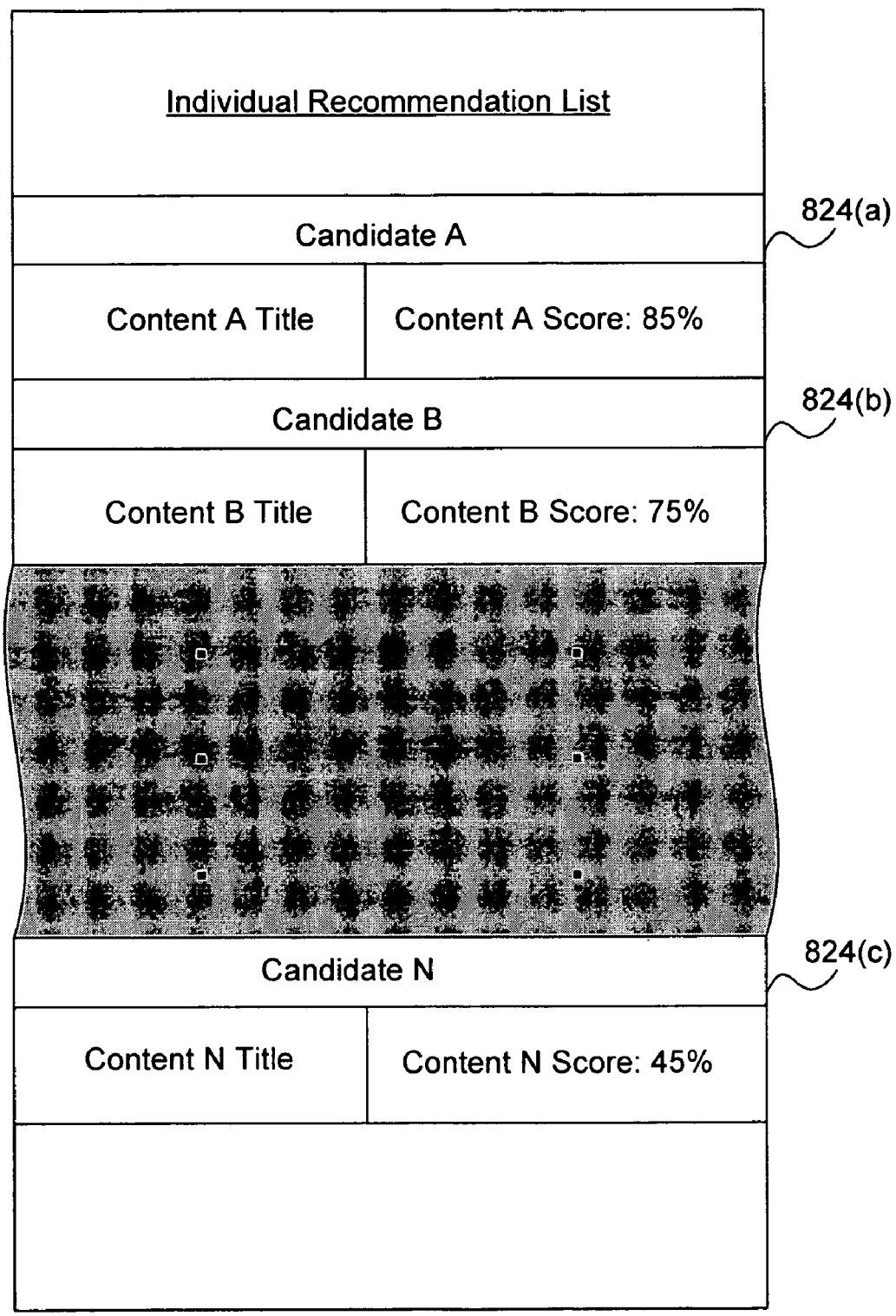
FIG. 8 is a diagram for one embodiment of an individual recommendation list from FIG. 4, in accordance with the present invention.

Referring now to FIG. 8, a diagram for one embodiment of a FIG. 4 individual recommendation list 416 is shown, in accordance with the present invention. In the FIG. 8 embodiment, individual recommendation list 416 includes, but is not limited to, a ranked series of candidates 824 that each represent a different content item from content database 320 of content server 118 (FIG. 1). In alternate embodiments, individual recommendation list 416 may include other components and information in addition to, or instead of, certain of those components and information discussed in conjunction with the FIG. 8 embodiment.

In the FIG. 8 embodiment, individual recommendation list 416 includes a candidate A 824(a) through a candidate N 824(c) that each has a corresponding content title and content score. For example, the FIG. 8 candidate A 824(a) includes a content A title and a content A score of 85%. In the FIG. 8 embodiment, candidate A 824(a) is therefore the optimal individual candidate based upon the highest content score. In alternate embodiments, particular content items may be identified by any other appropriate content item designation. For example, content items may be identified by a content identification number. In addition, in certain embodiments, ranking indicators for the transfer candidates 824 may be implemented in any other effective manner. For example, a numerical merit indicator other than a percentage may alternately be utilized.

In the FIG. 8 embodiment, a ranking manager 412 of recommendation engine 332 (FIG. 4) calculates the content scores to generate the ranked individual recommendation list 416 by analyzing any appropriate types of information. For example, ranking manager 412 may generate an individual recommendation list 416 for a given client device 126 by analyzing pre-determined ranking criteria that may include device user attributes and client device characteristics from a corresponding client profile 328 (FIG. 7).

Furthermore, ranking manager 412 may analyze the pre-determined ranking criteria by utilizing any effective techniques and procedures. For example, in certain embodiments, ranking manager 412 may perform a weighted averaging of the different ranking factors from the ranking criteria to determine a cost function that represents the likelihood of selecting and paying for the downloaded content item by a device user. Each of the various ranking factors may be associated with a different weighting value that represents the approximate significance of the corresponding ranking factor. The generation and utilization of individual recommendation lists 416 are further discussed below in conjunction with FIGS. 9-10.

Figure 9:
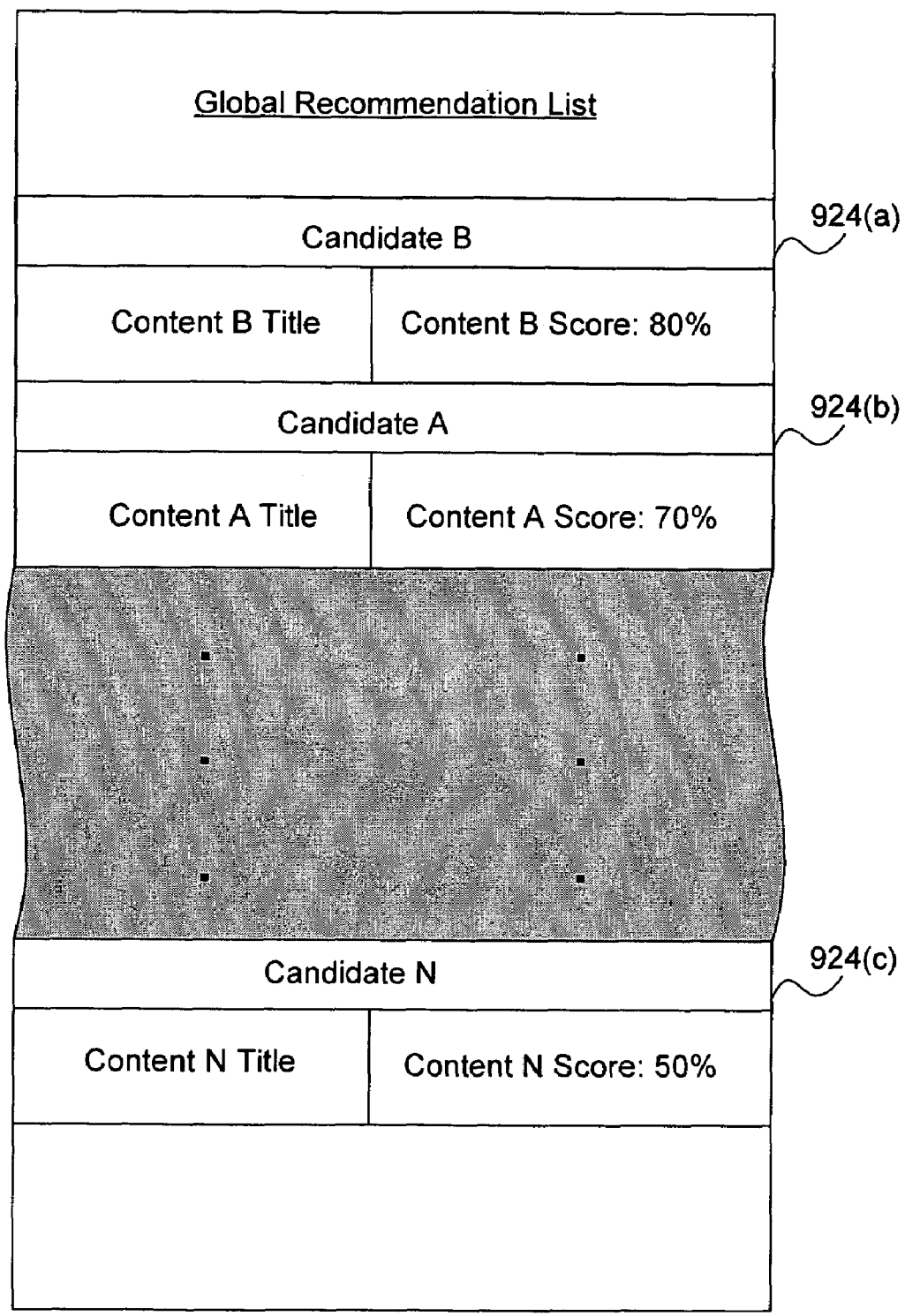
FIG. 9 is a diagram for one embodiment of a global recommendation list from FIG. 4, in accordance with the present invention.

Referring now to FIG. 9, a diagram for one embodiment of a FIG. 4 global recommendation list 420 is shown, in accordance with the present invention. In the FIG. 9 embodiment, global recommendation list 420 includes, but is not limited to, a ranked series of candidates 924 that each represent a different content item from content database 320 in content server memory 220 (FIG. 3). In alternate embodiments, global recommendation list 420 may include other components and information in addition to, or instead of, certain of those components and information discussed in conjunction with the FIG. 9 embodiment.

In certain content distribution systems, the individual recommendation list 416 of foregoing FIG. 8 may be utilized to identify an optimal individual candidate 824(a) (FIG. 8) for downloading to a corresponding individual client device 126. However, the optimal individual candidate 824(a) from the FIG. 8 individual recommendation list 416 may potentially be the optimal choice only for that single device user of the particular target client device 126. Because of the implementation of peer-to-peer network 134 (FIG. 2), various peer-to-peer content transfers may be performed directly between content devices 126 in peer-to-peer network 134 (FIG. 1B) to exchange previously-downloaded content items.

In accordance with the present invention, ranking manager 412 of content server 118 (FIG. 1A) advantageously generates a global recommendation list 420 based upon selectable global ranking criteria corresponding to multiple respective device users of target client devices 126 to thereby identify an optimal global candidate 924(a) for performing a content download procedure. In accordance with the present invention, content provider 114 may therefore only be required to pay content server 118 for downloading a single optimal global candidate 924(a) to one or more targeted content devices 126.

However, because of the foregoing peer-to-peer leveraging technique that is based upon utilizing global recommendation list 420, content provider 114 may advantageously still receive multiple content usage payments from respective target client devices 126 for utilizing the directly-transferred optimal global candidate 924(a) that these target client devices 126 received through peer-to-peer content transfers from other client devices 126, instead of via costly content download procedures from content server 118.

In the FIG. 9 embodiment, ranking manager 412 utilizes global ranking criteria from a plurality of respective device users of content devices 126 to re-rank the individual recommendation list 416 (FIG. 8) and thereby produce global recommendation list 420. In the FIG. 9 embodiment, global recommendation list 420 includes an optimal global candidate B 924(a), and a candidate A 924(b) through a candidate N 924(c) that each has a corresponding content title and content score. For example, the FIG. 9 optimal global candidate B 924(a) includes a content B title and a content B score of 80%. In the FIG. 9 embodiment, global candidate B 924(a) is therefore the optimal transfer candidate based upon a highest content score. In alternate embodiments, particular content items may be identified by any other appropriate content item designation. For example, content items may be identified by a content identification number. In addition, in certain embodiments, ranking indicators for the transfer candidates 924 may be implemented in any other effective manner. For example, a numerical merit indicator other than a percentage may alternately be utilized.

In the FIG. 9 embodiment, a ranking manager 412 of recommendation engine 332 (FIG. 4) calculates the content scores to generate the ranked global recommendation list 420 by analyzing any appropriate types of information. For example, ranking manager 412 may generate a global recommendation list 420 by analyzing pre-determined global ranking criteria from a selectable plurality of device users of client devices 126. In the FIG. 9 embodiment, global ranking criteria may include device user attributes and client device 126 characteristics from each of the corresponding client profiles 328 (FIG. 7) of the target client devices 126. In the FIG. 9 embodiment, ranking criteria may also include peer-to-peer statistics 428 (FIG. 4) and ranking information from the individual recommendation lists 416.

In addition, ranking manager 412 may analyze the predetermined global ranking criteria in any effective manner. For example, in certain embodiments, ranking manager 412 may perform a weighted averaging of the different ranking factors from the global ranking criteria to determine a cost function that represents the global likelihood of the content item being selected and paid for by respective target client devices 126. Each of the various global ranking factors may be associated with a different weighting value that represents the approximate significance of the corresponding global ranking factor. The generation and utilization of global recommendation list 420 is further discussed below in conjunction with FIG. 10.

Figure 10:
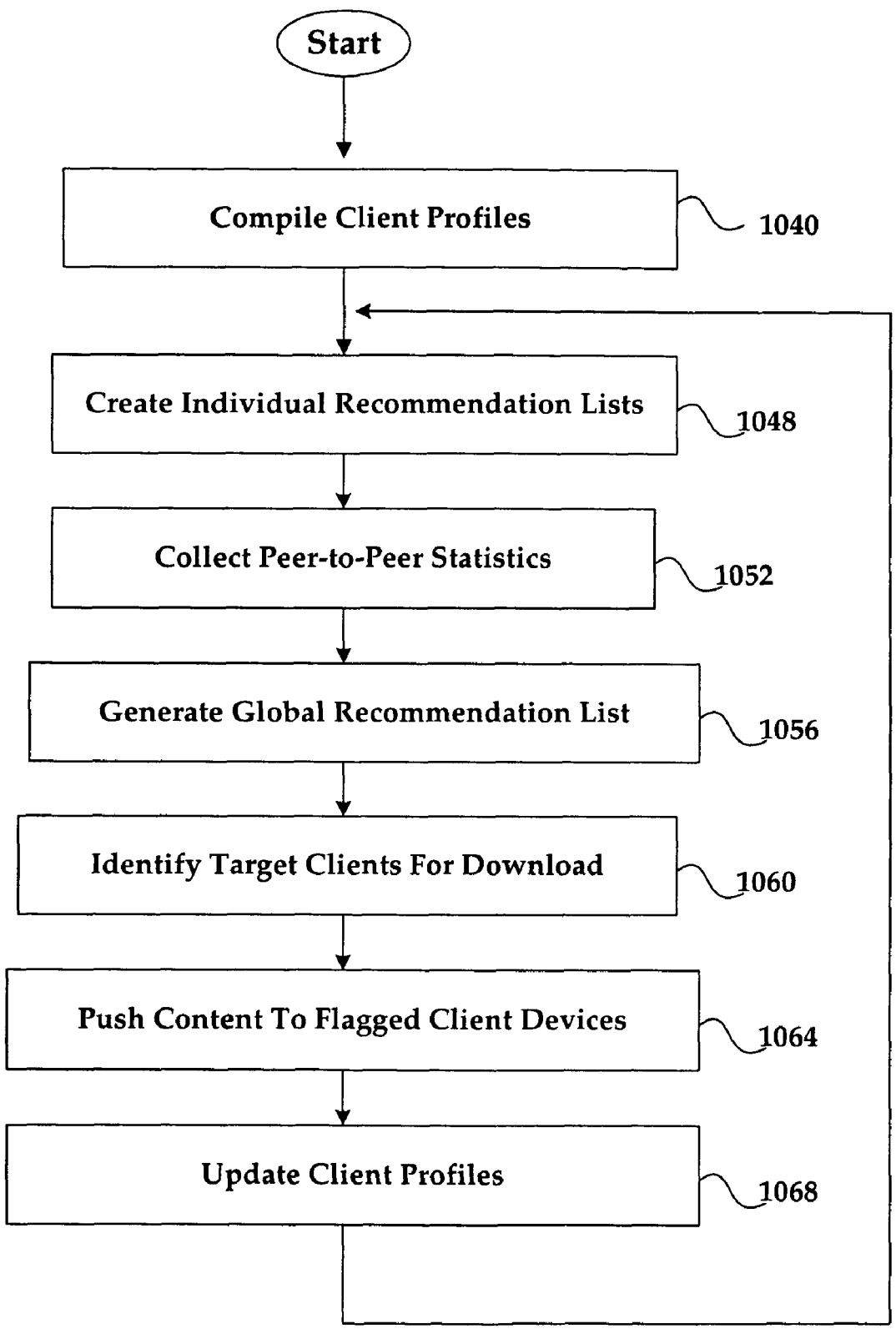
FIG. 10 is a flowchart of method steps for effectively providing content items to client devices in an electronic network, in accordance with one embodiment of the present invention.

Referring now to FIG. 10, a flowchart of method steps for effectively providing content items to client devices 126 is shown, in accordance with one embodiment of the present invention. The FIG. 10 flowchart is presented for purposes of illustration, and in alternate embodiments, the present invention may utilize steps and sequences other than those steps and sequences discussed in conjunction with the FIG. 10 embodiment.

In the FIG. 10 embodiment, in step 1040, a profile manager 324 of a content server 118 in an electronic network 110 initially performs various client profiling procedures to compile client profiles 328 for respective device users of client devices 126 that are arranged in a peer-to-peer network 134 within the electronic network 110. In step 1048, a ranking manager 412 of a recommendation engine 332 from the content server 118 then performs an individual content ranking procedure to create individual recommendation lists 416 that correspond to respective device users of the client devices 126. In the FIG. 10 embodiment, ranking manager 412 may utilize any effective techniques and/or individual ranking criteria to create the individual recommendation lists 416. For example, ranking manager 412 may utilize ranking factors from the client profiles 328 to generate the individual recommendation lists 416.

In the FIG. 10 embodiment, in step 1052, a peer-to-peer module 424 may collect peer-to-peer statistics 428 that reflect any appropriate information and characteristics of the peer-to-peer network 134. For example, peer-to-peer statistics 428 may include any desired type of statistical information regarding content transfer procedures for transferring content items between client devices 126 in peer-to-peer network 134. Then, in step 1056, the ranking manager 412 performs a global content ranking procedure to create a global recommendation list 420 that corresponds to global ranking criteria from a plurality of the device users of client devices 126.

In the FIG. 10 embodiment, ranking manager 412 may utilize any effective techniques and/or global ranking criteria to create the global recommendation list 420. For example, ranking manager 412 may utilize global ranking factors from client profiles 328 to generate the global recommendation list 420. In addition, ranking manager 412 may utilize global ranking factors from the individual recommendation lists 416 and the peer-to-peer statistics 428 to generate the global recommendation list 420.

In step 1060 of the FIG. 10 embodiment, a download targeting module 432 may perform a client targeting procedure that sets transfer flags to identify specific target client devices 126 for automatically downloading one or more content items identified by the global recommendation list 420. Download targeting module 432 may identify appropriate target client devices 126 by utilizing any appropriate techniques. For example, download targeting module 432 may evaluate client profiles 328 (FIG. 3) and/or peer-to-peer statistics 428 to determine which device users of client devices 126 would be likely to select and pay for a particular downloaded content item.

In step 1064, a communication manager 336 of content server 118 automatically and transparently performs a content download procedure to push an optimal candidate 924(a) from the global recommendation list 420 to flagged target client devices 126. Finally, in step 1068, the profile manager 324 of content server 118 performs a profile update procedure for updating client profiles 328 to reflect any recent download activity or other information changes in electronic network 110. The FIG. 10 procedure may then terminate. For at least the foregoing reasons, the present invention therefore provides an improved system and method for effectively providing content to client devices in an electronic network.

The invention has been explained above with reference to certain embodiments. Other embodiments will be apparent to those skilled in the art in light of this disclosure. For example, the present invention may readily be implemented using certain configurations and techniques other than those described in the specific embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for supporting content distribution in an electronic network, comprising:
   a content server that stores content items received from a content provider;
   a recommendation engine that creates a global recommendation list based upon client profiles to identify an optimal global candidate from among said content items for performing a content download procedure, said recommendation engine being implemented on said content server; and
   client devices that are connected to said content server through said electronic network, said content server automatically initiating a downloading procedure to push said optimal global candidate directly to one or more target devices that are specifically identified by said content server from among said client devices prior to said content download procedure by utilizing said global recommendation list based upon a plurality of device users of said client devices.

2. The system of claim 1, wherein said client devices are configured in a peer-to-peer network that supports direct bi-directional communications between any of said client devices.

3. The system of claim 1, wherein said content items comprise one or more of: entertainment programming, movies, video data, audio data, digital photographs, still image data, graphics, web pages, program guide information, and/or software programs.

4. The system of claim 2, wherein each of said target devices pay said content provider a content usage fee when respective device's users select and utilize said optimal global candidate downloaded from said content items on said content server.

5. The system of claim 4, wherein said content provider compensates said content server in return for performing said content download procedure to download said optimal global candidate.

6. The system of claim 5, wherein said client devices perform content transfer procedures to exchange and use said optimal candidate via said peer-to-peer network, said content provider responsively utilizing a peer-to-peer leveraging technique to receive said content usage fees from said client devices, while compensating said content server for performing only a single instance of said content download procedure.

7. The system of claim 1, further comprising a profile manager that compiles said client profiles corresponding to device users of said client devices, said client profiles being analyzed to create said global recommendation list, said client profiles comprising one or more of: client download transaction histories, client demographic information, client Internet browsing patterns, current available memory for said client devices, and/or hardware/software configurations of said client devices.

8. The system of claim 2, further comprising a peer-to-peer statistics module that compiles peer-to-peer statistics regarding content transfer procedures of said client devices through said peer-to-peer network, said peer-to-peer statistics being utilized by said recommendation engine to create said global recommendation list.

9. The system of claim 2, further comprising a download targeting module on said content server for performing a client targeting procedure that sets transfer flags to identify said targeted devices, said download targeting module evaluating client profiles of said client devices and peer-to-peer statistics for content transfer procedures in said peer-to-peer network to determine which of said client devices are likely to select and utilize said optimal global candidate.

10. The system of claim 2, wherein a ranking manager of said recommendation engine performs an individual content ranking procedure to create individual recommendation lists that correspond to respective device users of said client devices.

11. The system of claim 10, wherein said ranking manager creates said individual recommendation lists by analyzing pre-defined ranking criteria from said client profiles of said respective device users of said client devices, said pre-defined ranking criteria comprising one or more of: client download transaction histories, client demographic information, client Internet browsing patterns, current available memory for said client devices, and/or hardware/software configurations of said client devices.

12. The system of claim 11, wherein said ranking manager prioritizes said individual recommendation lists by calculating weighted averages of ranking factors from said pre-defined ranking criteria to determine individual cost functions that represent individual likelihoods of utilizing downloaded content items by said respective device users.

13. The system of claim 10, wherein a peer-to-peer statistics module on said content server compiles peer-to-peer statistics regarding content transfer procedures of said client devices through said peer-to-peer network.

14. The system of claim 13, wherein said peer-to-peer statistics module periodically queries said client devices to obtain updated content transfer information to update said peer-to-peer statistics.

15. The system of claim 13, wherein said ranking manager of said recommendation engine performs a global content ranking procedure to create said global recommendation list based upon global ranking criteria corresponding to a plurality of said client devices.

16. The system of claim 15, wherein said ranking manager creates said global recommendation list by analyzing said pre-defined ranking criteria from a plurality of said respective device users, said pre-defined ranking criteria comprising client profiles, said peer-to-peer statistics, and said individual recommendation lists.

17. The system of claim 16, wherein said ranking manager prioritizes said global recommendation list by calculating weighted averages of ranking factors from said pre-defined ranking criteria to determine global cost functions that represent global likelihoods of utilizing said optimal global candidate by said client devices.

18. The system of claim 15, wherein a download targeting module on said content server performs a client targeting procedure that sets transfer flags to identify said target devices, said download targeting module evaluating said client profiles of said client devices and said peer-to-peer statistics of said content transfer procedures in said peer-to-peer network to determine which of said client devices are likely to select and utilize said optimal global candidate.

19. The system of claim 18, wherein a communication manager of said content server automatically and transparently performs said content download procedure to push said optimal global candidate from said global recommendation list to said target client devices.

20. The system of claim 19, wherein a profile manager of said content server performs a profile update procedure to update said client profiles to reflect any recent download activity or other information changes in said electronic network.

21. A method for supporting content distribution in an electronic network, comprising:
   storing content items received from a content provider into a content server;
   utilizing a recommendation engine to create a global recommendation list based upon device profiles to identify an optimal global candidate from among said content items for performing a content download procedure, said recommendation engine being implemented on said content server; and
   connecting client devices to said content server through said electronic network, said content server automatically initiating a downloading procedure to push said optimal global candidate directly to one or more target devices that are specifically identified by said content server from among said client devices prior to said content download procedure by utilizing said global recommendation list based upon a plurality of device users of said client devices.

22. The method of claim 21, wherein said client devices are configured in a peer-to-peer network that supports direct bi-directional communications between any of said client devices.

23. The method of claim 21, wherein said content items comprise one or more of: entertainment programming, movies, video data, audio data, digital photographs, still image data, graphics, web pages, program guide information, and/or software programs.

24. The method of claim 22, wherein each of said target devices pay said content provider a content usage fee when respective devices users select and utilize said optimal global candidate downloaded from said content items on said content server.

25. The method of claim 24, wherein said content provider compensates said content server in return for performing said content download procedure to download said optimal global candidate.

26. The method of claim 25, wherein said client devices perform content transfer procedures to exchange and use said optimal candidate via said peer-to-peer network, said content provider responsively utilizing a peer-to-peer leveraging technique to receive said content usage fees from said client devices, while compensating said content server for performing only a single instance of said content download procedure.

27. The method of claim 21, further comprising a profile manager that compiles said client profiles corresponding to device users of said client devices, said client profiles being analyzed to create said global recommendation list, said client profiles comprising one or more of: client download transaction histories, client demographic information, client Internet browsing patterns, current available memory for said client devices, and/or hardware/software configurations of said client devices.

28. The method of claim 22, further comprising a peer-to-peer statistics module that compiles peer-to-peer statistics regarding content transfer procedures of said client devices through said peer-to-peer network, said peer-to-peer statistics being utilized by said recommendation engine to create said global recommendation list.

29. The method of claim 22, further comprising a download targeting module on said content server for performing a client targeting procedure that sets transfer flags to identify said targeted devices, said download targeting module evaluating client profiles of said client devices and peer-to-peer statistics for content transfer procedures in said peer-to-peer network to determine which of said client devices are likely to select and utilize said optimal global candidate.

30. The method of claim 22, wherein a ranking manager of said recommendation engine performs an individual content ranking procedure to create individual recommendation lists that correspond to respective device users of said client devices.

31. The method of claim 30, wherein said ranking manager creates said individual recommendation lists by analyzing pre-defined ranking criteria from said client profiles of said respective device users of said client devices, said pre-defined ranking criteria comprising client download transaction histories, client demographic information, client Internet browsing patterns, current available memory for said client devices, and hardware/software configurations of said client devices.

32. The method of claim 31, wherein said ranking manager prioritizes said individual recommendation lists by calculating weighted averages of ranking factors from said pre-defined ranking criteria to determine individual cost functions that represent individual likelihoods of utilizing downloaded content items by said respective device users.

33. The method of claim 30, wherein a peer-to-peer statistics module on said content server compiles peer-to-peer statistics regarding content transfer procedures of said client devices through said peer-to-peer network.

34. The method of claim 33, wherein said peer-to-peer statistics module periodically queries said client devices to obtain updated content transfer information to update said peer-to-peer statistics.

35. The method of claim 33, wherein said ranking manager of said recommendation engine performs a global content ranking procedure to create said global recommendation list based upon global ranking criteria corresponding to a plurality of said client devices.

36. The method of claim 35, wherein said ranking manager creates said global recommendation list by analyzing said pre-defined ranking criteria from a plurality of said respective device users, said pre-defined ranking criteria comprising client profiles, said peer-to-peer statistics, and said individual recommendation lists.

37. The method of claim 36, wherein said ranking manager prioritizes said global recommendation list by calculating weighted averages of ranking factors from said pre-defined ranking criteria to determine global cost functions that represent global likelihoods of utilizing said optimal global candidate by said client devices.

38. The method of claim 35, wherein a download targeting module on said content server performs a client targeting procedure that sets transfer flags to identify said target devices, said download targeting module evaluating said client profiles of said client devices and said peer-to-peer statistics of said content transfer procedures in said peer-to-peer network to determine which of said client devices are likely to select and utilize said optimal global candidate.

39. The method of claim 38, wherein a communication manager of said content server automatically and transparently performs said content download procedure to push said optimal global candidate from said global recommendation list to said target client devices.

40. The method of claim 39, wherein a profile manager of said content server performs a profile update procedure to update said client profiles to reflect any recent download activity or other information changes in said electronic network.

41. A system for supporting content distribution in an electronic network, comprising:
    a content server that stores content items;
    a recommendation engine that creates a global recommendation list based upon client profiles to identify an optimal global candidate from among said content items for automatically initiating and performing a content download procedure, said recommendation engine being implemented on said content server; and
    target client devices that receive said optimal global candidate that is automatically pushed directly from said content server during said content download procedure, said target devices being specifically identified by said content server from among said target client devices prior to said content download procedure by utilizing said global recommendation list based upon a plurality of device users of said client devices.

42. The system of claim 1, wherein said content server comprises said recommendation engine and a profile manager, said recommendation engine comprising a ranking manager, a peer-to-peer statistics module, and a download targeting module.

* * * * *